(12) United States Patent
Flannery

(10) Patent No.: US 7,281,646 B2
(45) Date of Patent: Oct. 16, 2007

(54) GRILL MOUNTING APPARATUS FOR A VEHICLE

(76) Inventor: Brian Flannery, P.O. Box 610, Brooks, Alberta (CA) T1R 1B6

( * ) Notice: Subject to any disclaimer, the term of this patent is extended or adjusted under 35 U.S.C. 154(b) by 575 days.

(21) Appl. No.: 10/715,612

(22) Filed: Nov. 19, 2003

(65) Prior Publication Data
US 2005/0103816 A1 May 19, 2005

(51) Int. Cl.
*B60R 9/06* (2006.01)
*F24C 1/16* (2006.01)

(52) U.S. Cl. ............... 224/509; 224/505; 224/512; 224/515; 224/524; 126/276

(58) Field of Classification Search ............. 224/509, 224/502, 282, 488, 495, 505, 506, 511, 512, 224/524; 126/276
See application file for complete search history.

(56) References Cited

U.S. PATENT DOCUMENTS

| 3,032,783 | A | * | 5/1962 | Swanson, Jr. ............ 114/364 |
| 4,518,189 | A | | 5/1985 | Belt |
| 4,729,535 | A | | 3/1988 | Frazier et al. |
| 4,856,423 | A | | 8/1989 | Burns |
| 4,887,526 | A | | 12/1989 | Blatt |
| 5,038,983 | A | * | 8/1991 | Tomososki ............ 224/521 |
| 5,104,015 | A | * | 4/1992 | Johnson ............ 224/401 |
| 5,263,467 | A | | 11/1993 | Jones |
| 5,518,156 | A | * | 5/1996 | Lehman ............ 224/281 |
| 5,518,159 | A | * | 5/1996 | DeGuevara ............ 224/488 |
| 5,575,521 | A | | 11/1996 | Speis |
| 5,626,126 | A | | 5/1997 | McNulty |
| 5,640,949 | A | | 6/1997 | Smith |
| 5,730,066 | A | | 3/1998 | Auten et al. |
| 5,752,639 | A | | 5/1998 | Rice |
| 5,806,736 | A | * | 9/1998 | Kincart ............ 224/509 |
| 5,950,617 | A | | 9/1999 | Lorenz |
| 6,237,823 | B1 | * | 5/2001 | Stewart et al. ............ 224/509 |
| 6,354,286 | B1 | | 3/2002 | Davis |
| 6,520,473 | B2 | | 2/2003 | Lee |
| 6,701,913 | B1 | * | 3/2004 | LeDuc et al. ............ 126/276 |
| 6,877,505 | B1 | * | 4/2005 | Den Hoed ............ 126/276 |
| 2004/0040553 | A1 | * | 3/2004 | McKoski ............ 126/276 |

* cited by examiner

*Primary Examiner*—Nathan J. Newhouse
*Assistant Examiner*—Justin M. Larson
(74) *Attorney, Agent, or Firm*—Bay Area Patent Group LLC

(57) ABSTRACT

An apparatus for mounting a grill to a vehicle bumper is provided. The apparatus for mounting a grill to a vehicle bumper includes a support platform, a support arm attached to the support platform at an end thereof, a pivot mount assembly for attaching an end of the support arm to a vehicle bumper, and a retaining mount assembly. A grill is fixedly mounted to the support platform by securing the grill to grill mounting flanges, which are attached to the support platform. The support arm is pivotal about the pivot mount assembly allowing the grill to be rotated about the vehicle for positioning of the grill for use. In addition, the grill support platform can be pivotal about the support arm allowing greater versatility in positioning the grill for use. The retaining mount assembly is attached to the vehicle bumper at a spaced distance from the pivot mount assembly and functions to retain the support arm in a non-use position against or parallel to the vehicle bumper.

9 Claims, 7 Drawing Sheets

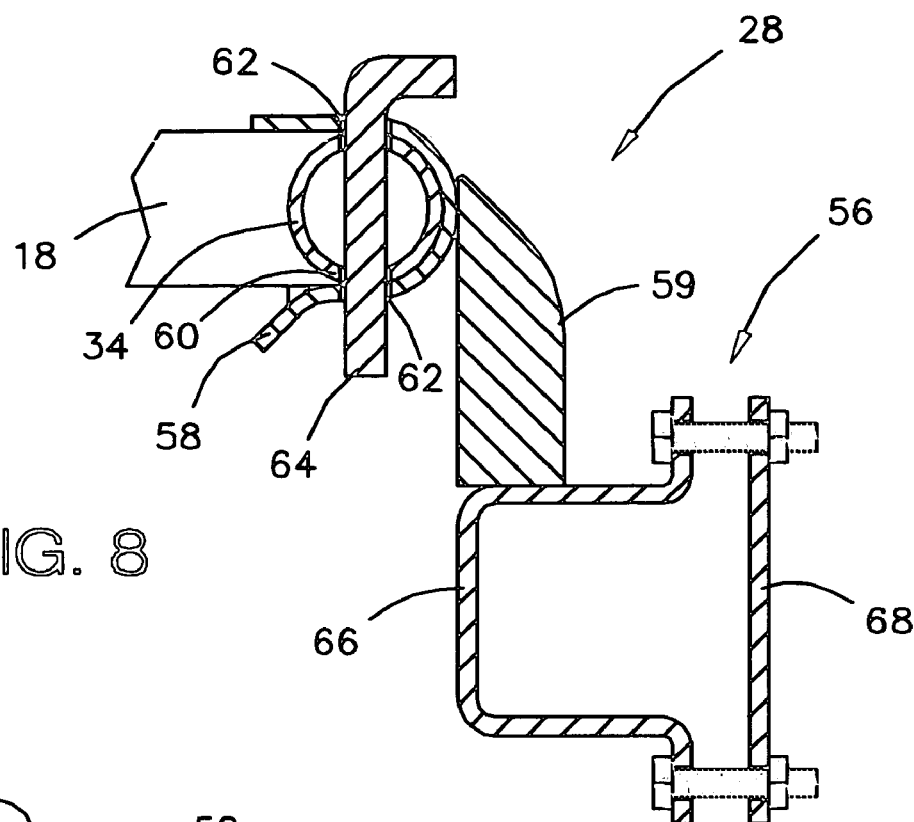
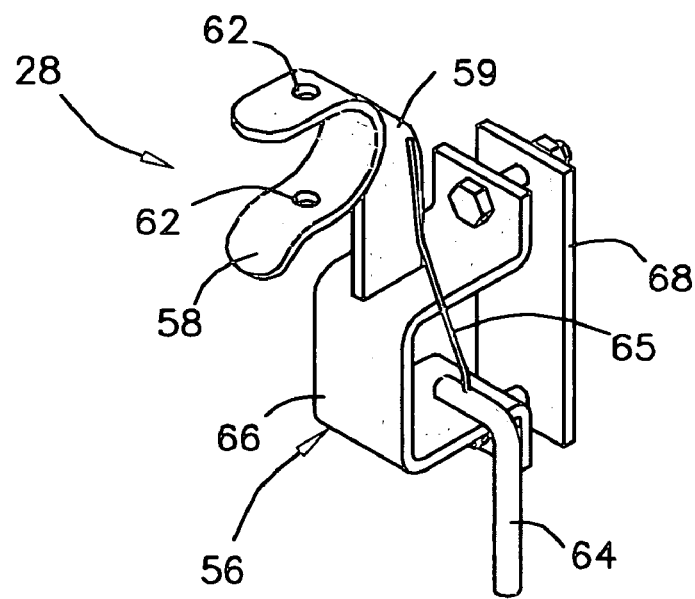
FIG. 8
FIG. 9

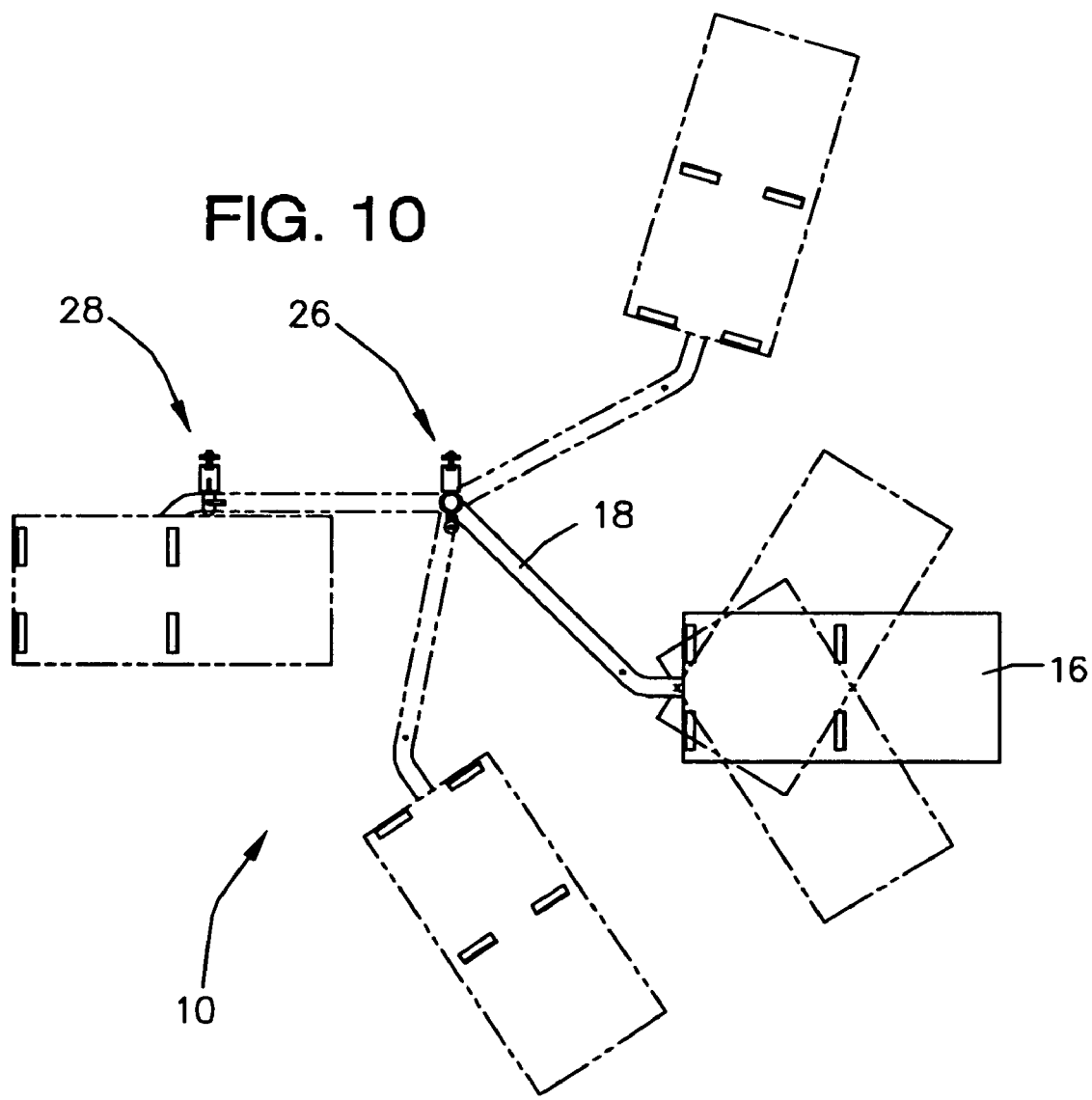

US 7,281,646 B2

GRILL MOUNTING APPARATUS FOR A VEHICLE

BACKGROUND OF THE INVENTION

FIELD OF THE INVENTION

The present invention relates generally to an apparatus for mounting a grill to a vehicle. More particularly, relating to an apparatus for mounting a grill to the bumper of a vehicle, such as a bumper of a recreational vehicle.

SUMMARY OF THE INVENTION

In accordance with the present invention, an apparatus for mounting a grill to a vehicle bumper is provided. Briefly, the apparatus for mounting a grill to a vehicle bumper includes a support platform for supporting the grill thereon and a support arm attached at one end to the support platform with the opposite end attached to bumper of the vehicle. The support arm is pivotal with respect to its attachment point to the bumper allowing the support platform, supporting the grill, to swing outward from the vehicle.

More particularly, the apparatus for mounting a grill to a vehicle bumper comprises a support arm having a first end and a second end. The second end of the support arm is attached to a support platform for support a grill thereon. The first end of support arm is attached to a pivot mount assembly, which is attached to the vehicle bumper. The first end of the support arm is pivotal about the pivot mount assembly, thereby allowing the grill to be pivoted into an in-use position. In addition, a retaining mount assembly is also attached to the bumper and functions retain the support arm against or parallel to the bumper when the grill is stored for transport or when the grill is not in use.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a cross-section view taken along line 8—8 in FIG. 4.

FIG. 9 is a perspective view of the retaining mount assembly of the present invention.

FIG. 10 is a top plan view of the grill mounting apparatus for a vehicle of the present invention in alternate positions.

The same reference numerals refer to the same parts throughout the various figures.

DETAILED DESCRIPTION OF THE INVENTION

Figure 1:
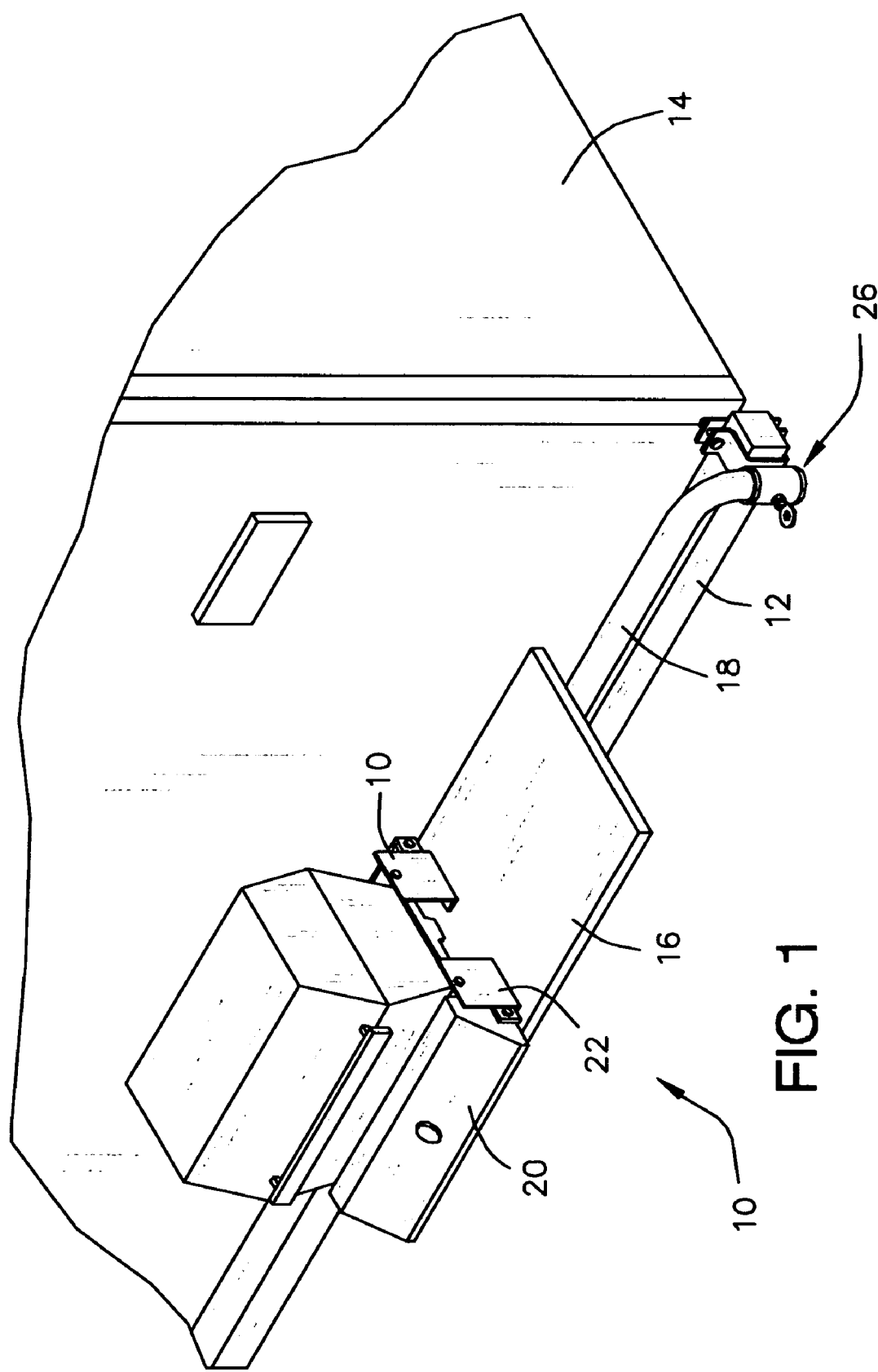
FIG. 1 is a perspective view of the preferred embodiment of the grill mounting apparatus for a vehicle constructed in accordance with the principles of the present invention positioned in a non-use position.

Referring now to the drawings, and particularly to FIGS. 1-10, a preferred embodiment of the grill mounting apparatus for a vehicle of the present invention is shown and generally designated by the reference numeral 10.

In FIG. 1, a new and improved grill mounting apparatus for a vehicle of the present invention for mounting a grill to the bumper of a vehicle is illustrated and will be described. More particularly, the grill mounting apparatus for a vehicle 10 is shown attached to the rearward bumper 12 of a vehicle 14, such as a recreational vehicle (RV). The grill mounting apparatus 10 includes a support platform 16 that is attached to a support arm 18 which is pivotally attached to the bumper 12. The support platform 16 can be pivotally secured to the support arm 18 allowing the support platform to pivot about its attachment point to the support arm. A grill 20 is positioned on the support platform 16 and can be fixedly attached thereto by a least two grill mounting flanges 22 and the grill is secured to each mounting flange through the use of a fastener 24, such as a bolt. The support platform 16, having the grill 20, can be positioned outward from the bumper 12 and the rearward portion of the vehicle 14 by pivoting the support arm 18 about its attachment point to the vehicle bumper, thereby making the grill accessible for cooking. A pivot mount assembly 26, which will be described in further detail subsequent hereto, attaches the support arm 18 to the vehicle bumper.

Ideally, the support platform 16 is generally rectangular in shape and has a length that is greater then the length of a grill 20 to be supported by the platform. Preferably, the grill 20 is positioned to one side of the support platform 16, thereby leaving a portion of the support platform available for workspace.

Figure 2:
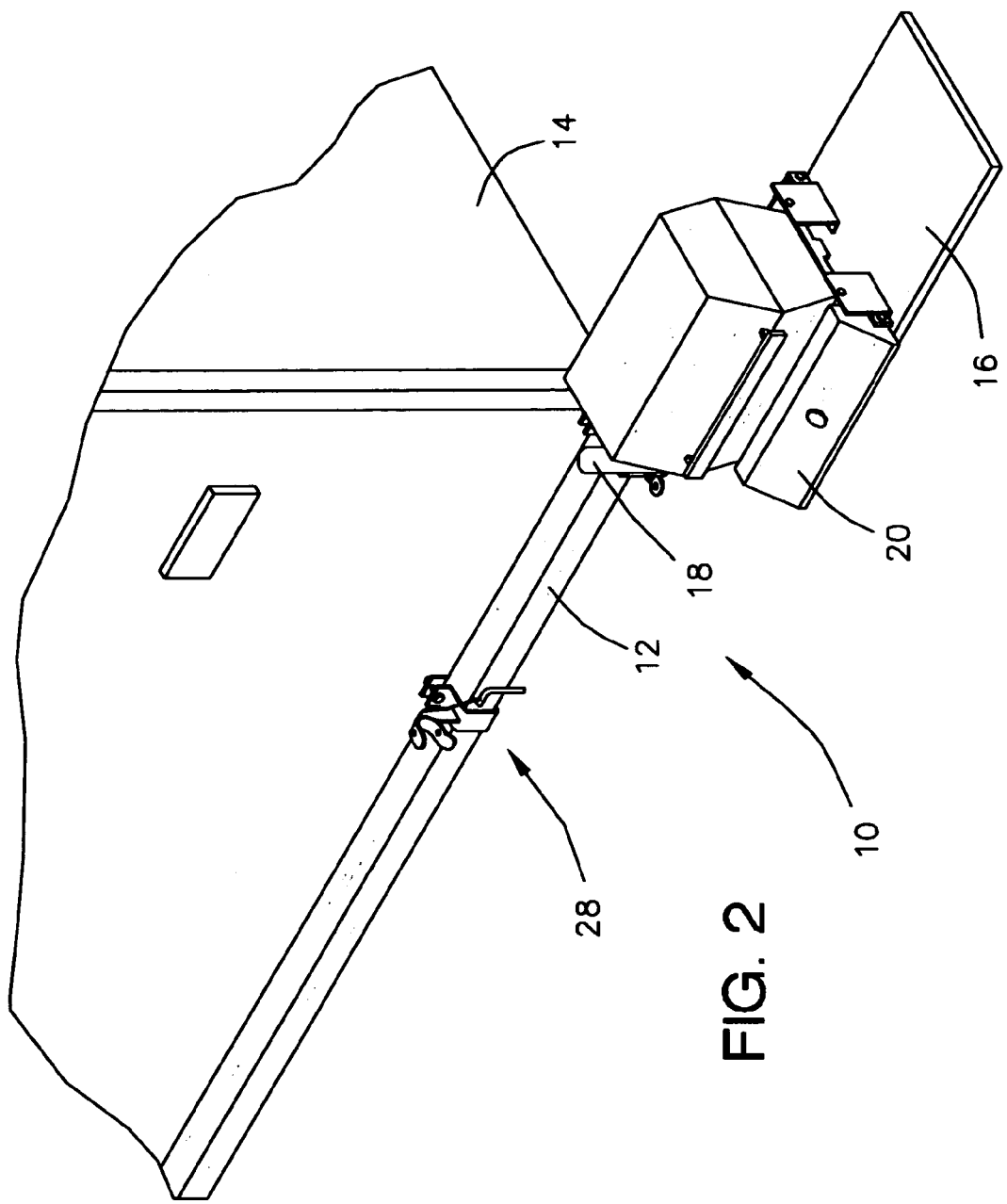
FIG. 2 is an alternate perspective view of the grill mounting apparatus for a vehicle of the present invention positioned in a possible in-use position.

Turning to FIG. 2, the grill mounting apparatus 10 is shown with the support arm 18 rotated away from the bumper 12 and towards the side of the vehicle 14. The ability for the support platform 16 to pivot about the support arm 18 is illustrated in this view with the support platform being pivoted about the support arm approximately 100 degrees, thereby allowing the grill to remain facing outward from the vehicle 14. The support platform 16 is free to pivot about the support arm 18 a full and continuous 360 degrees.

The grill mounting apparatus 10 further includes a retaining mount assembly 28 that is attached to the bumper 12 at a spaced distance from the pivot mount assembly 26. The retaining mount assembly, which will be described in detail later, is provided to retain the support arm 18 in a non-use, stored position against or parallel to the bumper 12 and prevent the support arm from pivoting about the pivot mount assembly 26.

Figure 3:
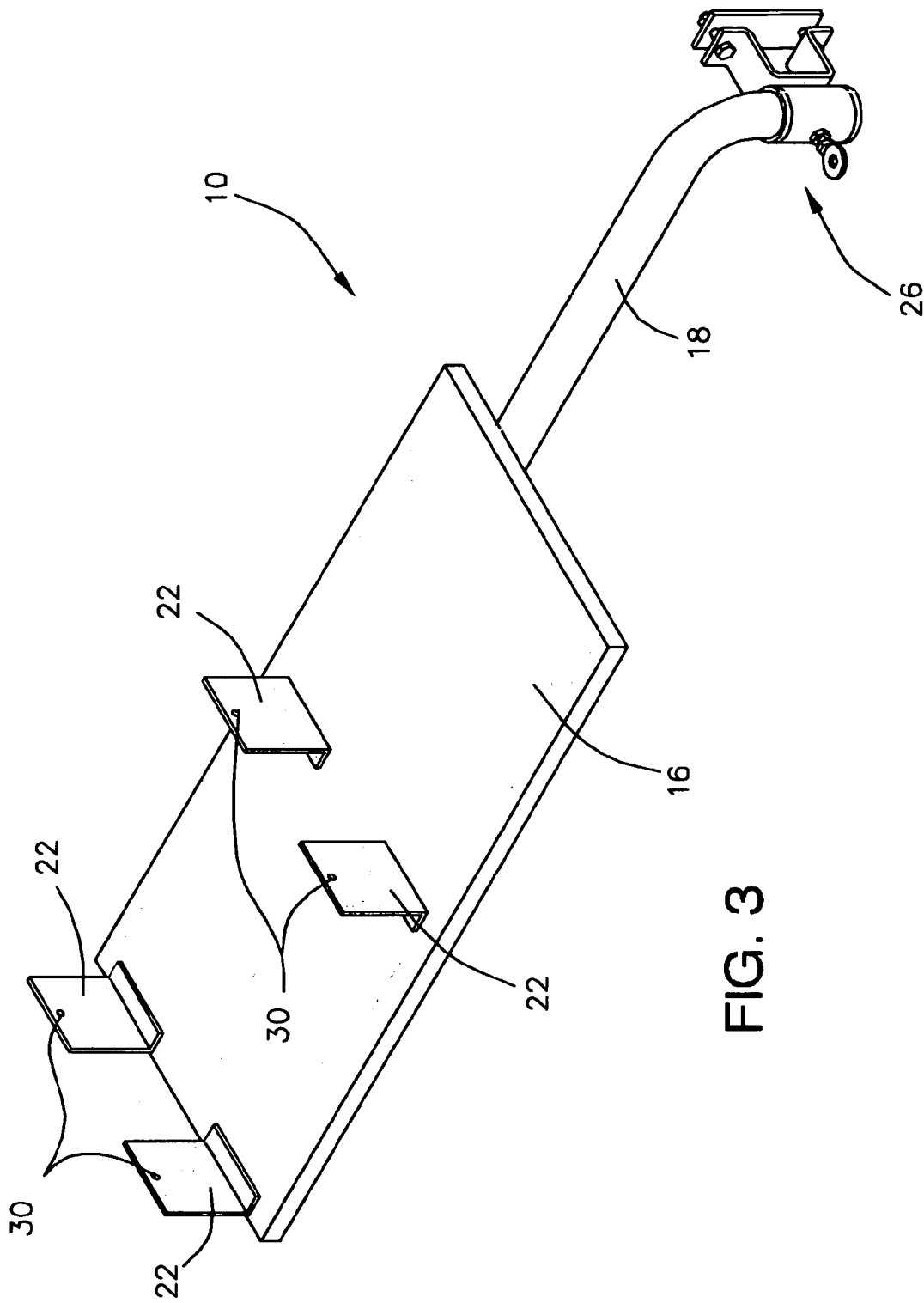
FIG. 3 is a perspective view of the grill mounting apparatus for a vehicle of the present invention without a grill attached thereto.
Figure 4:
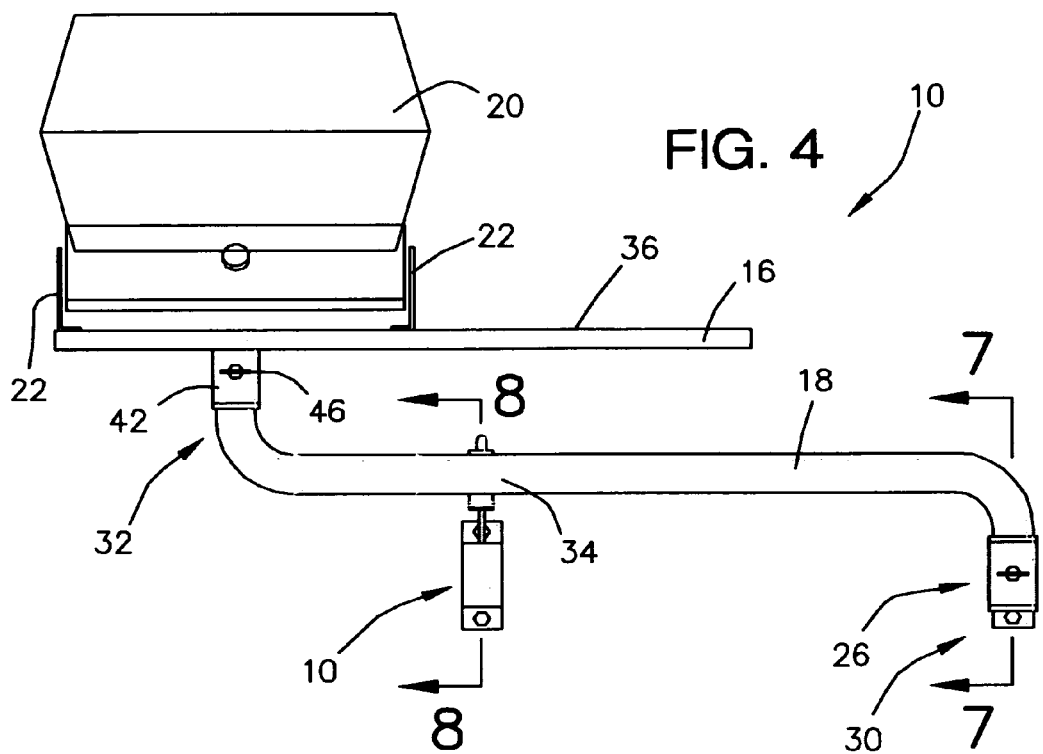
FIG. 4 is a front elevation view of the grill mounting apparatus for a vehicle of the present invention.
Figure 5:
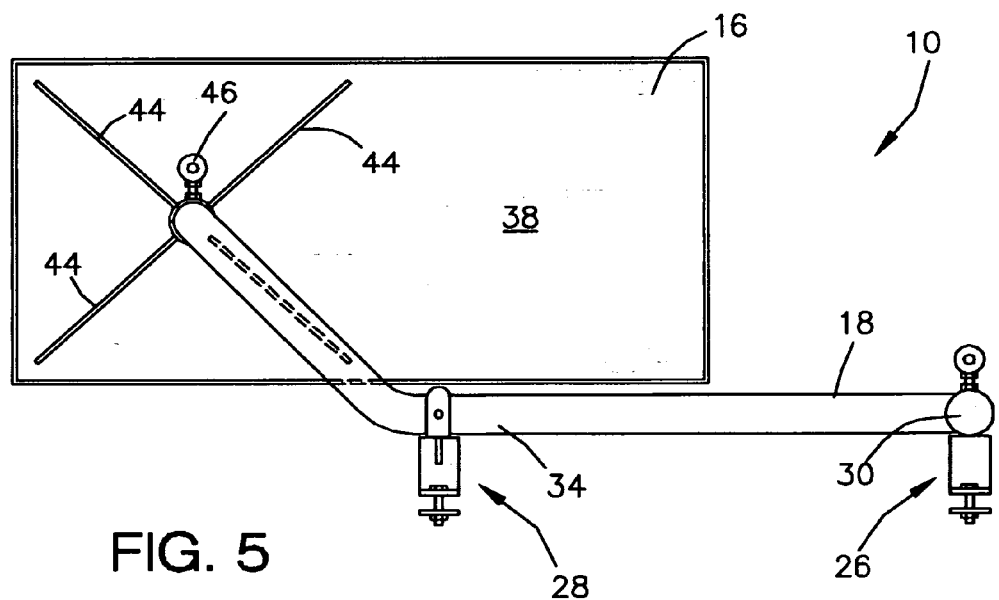
FIG. 5 is a bottom plan view of the grill mounting apparatus for a vehicle of the present invention.

Turning to FIG. 3, the grill mounting apparatus 10 is shown with out the grill 20 and not attached to the bumper 12 of the vehicle 14 and is illustrated in a preferred embodiment having four grill mounting flanges 22. Two grill mounting flanges 22 are attached to the support platform along one edge thereof with the remaining two grill mounting flanges attached to the support platform intermediate its ends and at an equal spaced distance from the first two flanges. The equal spaced distance between the flanges is substantially equal to the width of the grill 20 being attached to the grill mounting apparatus 10. The flanges 22 each include a hole 30 formed therethrough for passing a fastener 24 through to secure the grill 20 to each flange.

Referring now to FIGS. 4-10, the grill mounting apparatus 10 includes a support arm 18, a support platform 16, a pivot mount assembly 26 and a retaining mount assembly 28. The support arm 18 of a diameter is generally oriented parallel with the horizon and includes a first end 30, a second end 32 and a horizontal portion 34 extending between the first and second ends. Preferably, the first end 30 is bent orthogonal to the support arm 28 and the second end 32 is bent orthogonal to the support arm in the opposite direction that the first end is bent. In other words, the first end 30 extends vertically downward from the horizontal portion 34, and the second end 32 extends vertically upward from the horizontal portion. The horizontal portion 34 can also include a bend intermediate the ends 30 and 32, wherein the bend is made such that the horizontal portion remains in the same plane and the first and second ends 30, 32 are offset from one another.

The support platform 16 is generally rectangular in shape and has a top surface 36, a bottom surface 38 and an edge 40 formed around the perimeter of the support platform. An attachment collar 42 is attached to the bottom surface 38 and has an inner diameter (I.D.) greater than the diameter of the support arm 18. The second end 32 of the support arm 18 is attached to the attachment collar 42, which is free to rotate about the second end 32, thereby allowing the support platform 16 to pivot about the second end in a plane that is orthogonal to the second end. A plurality of gussets 44 can be attached radially around the attachment collar 42 and the bottom surface 38 to add additional support to the attachment collar. A thumbscrew 46 can be threadably received in a hole formed through the side of the attachment collar 42 and is tightened against the support arm 18 to prevent the collar from rotating around the second end 32 of the support arm.

At least two, preferably, four grill mounting flanges 22 are attached to the top surface 36 of the support platform 16 to which the grill 20 is fixedly attached to by a plurality of fasteners 24, such bolts. The support platform 16 is of a length greater than the length of the grill 20 attached thereto. Preferably, the support platform 16 is at least 1.5 times the length of the grill and the grill mounting flanges 22 are positioned towards one side of the support platform, with two of the flanges positioned juxtaposed along an edge thereof with the opposite two flanges attached juxtaposed to the support platform at a spaced distance substantially equal to the length of the grill 20. With the grill 20 positioned towards one side of the support platform 16 a free workspace is provided along side the grill.

Figure 6:
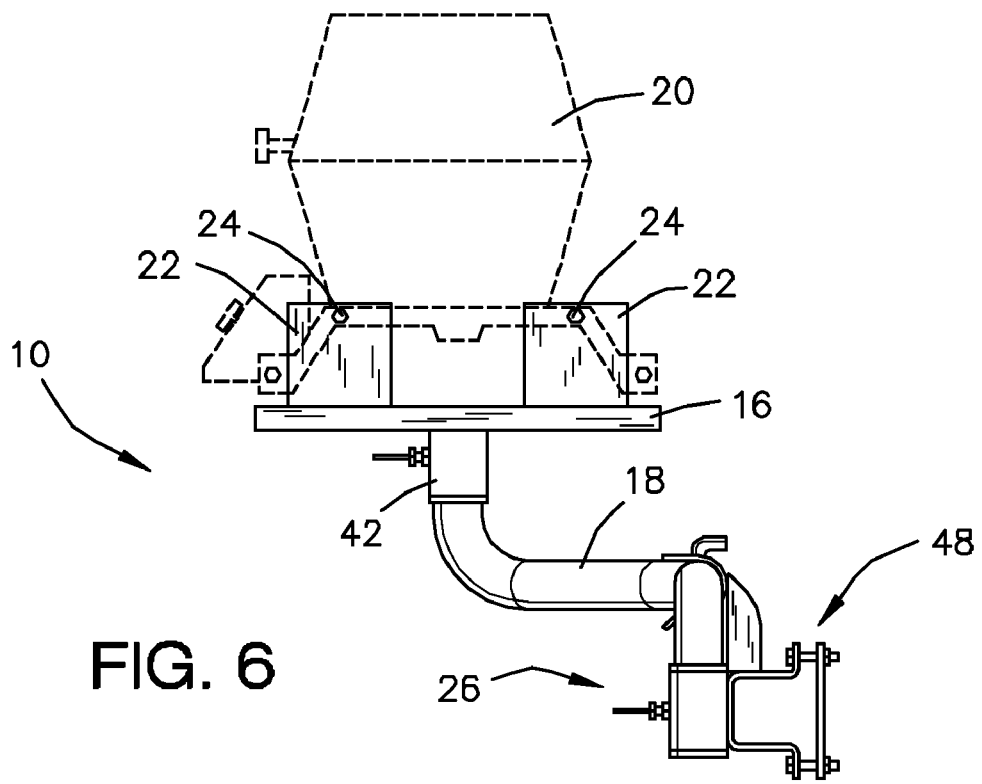
FIG. 6 is a side elevation view of the grill mounting apparatus for a vehicle of the present invention.
Figure 7:
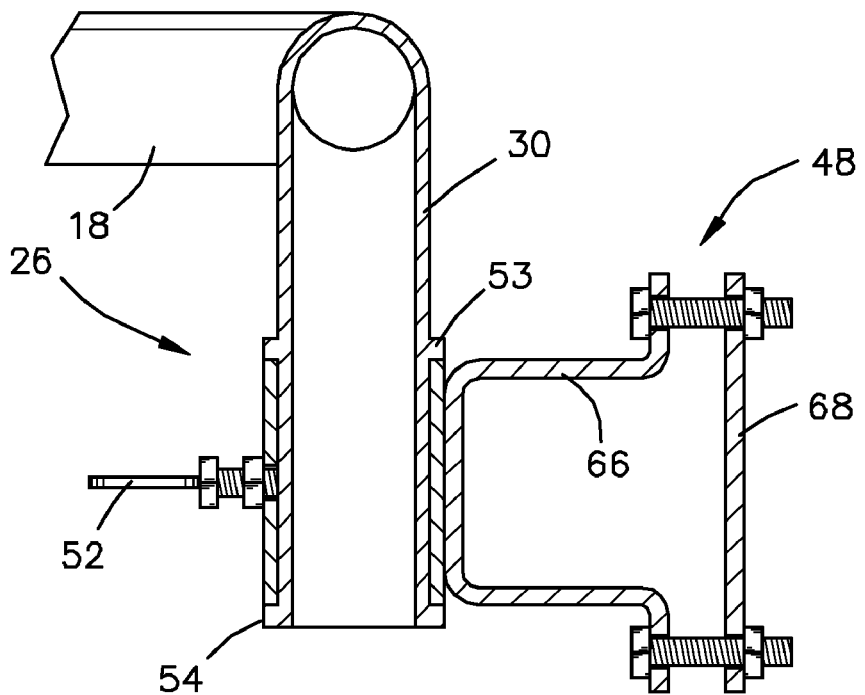
FIG. 7 is a cross-section view taken along line 7—7 in FIG. 4.

Turning to FIGS. 6 and 7, the pivot mount assembly 26 is attached to the first end 30 of the support arm 18 and is used to mount or otherwise attach the second end of the support arm to a vehicle bumper. More particularly, the pivot mount assembly 26 includes a first clamp means 48 for clamping the pivot mount assembly to the bumper of a vehicle and a pivot collar 50 is attached to the clamp means 48. The pivot collar 50, having an ID greater than the diameter of the support arm 18, is attached to the first end 30 of the support arm so that the first end is rotatable within the pivot collar, thereby allowing the support arm to pivot about the pivot collar. A second thumbscrew 52 is threadably received by a hole formed through the side of the pivot collar 50 and is tightened to prevent the support arm 18 from pivoting about the pivot collar. A first retaining ring 53 may be attached to the first end 30 above the pivot collar 50 to provide a bearing surface for the support arm to pivot about the pivot collar and to prevent the second end from egressing into the pivot collar beyond a desired distance. A second retaining ring 54 can be secured to the distal end of the second end 30 of the support arm 18 to prevent the second end from being removed from the pivot collar 50.

Turning to FIGS. 8 and 9, the retaining mount assembly 28 is provided to retain the support arm 18 in a position against or parallel to the vehicle bumper for transport or when the grill 20 is not in use. The retaining mount assembly 28 includes a second clamp means 56 for attaching the retaining mount assembly to the vehicle bumper and a receiver member 58 for receiving a longitudinal section of the horizontal portion 34 of the support arm 18. The receiver member 58 is generally U-shaped with a pair of legs defining an open space therebetween, with the open space of a distance that is greater than the diameter of the support arm 18. An end of one of the legs of the receiver member 58 can be bent slightly outwards in a direction away from the other leg, thereby making insertion of the longitudinal section of the horizontal portion 34 of the support arm 18 into the receiver member easier. In addition, the horizontal portion 34 may have a through-hole 60 formed therethrough and the receiver member 58 may have cooperating through holes 62 formed through each leg for receiving a pin 64 to lock the support arm 18 to the receiver member 58.

The first and second clamp means 48 and 56 for attaching the pivot mount assembly 26 and the retaining mount assembly 28 respectively to the vehicle bumper each include a first clamp member 66 and a second clamp member 68. The first clamp member 66 is generally U-shaped having a pair of parallel legs with orthogonally bent ends 70 each end having a hole formed therethrough. The second clamp member 68 is generally flat and rectangular shaped and includes two holes one formed through each end of thereof to cooperate with the holes formed through the ends of the first clamp member 66. The U-Shaped portion of the first clamp 66 member is sized to receive a longitudinal section of a vehicle bumper therein and the second clamp member 68 being secured to the first clamp member sandwiching the bumper therebetween. The first and second clamp members 66 and 68 are secured to each other by passing a fastener, such as a bolt, through each cooperating hole formed in the first and second clamp members.

While the first and second clamp means are described in detail, the specific structure of each clamp means can be substituted for an equivalent structure serving the same function of attaching the pivot mount assembly 26 and retaining mount assembly 28 to a vehicle bumper without departing from the true scope of the invention.

Now referring to FIG. 10, the support platform 16 is shown in multiple positions pivoted about the second end 32 of the support arm 18 and the support arm is shown in multiple positions pivoted about the pivot collar 50 to illustrate the versatility in being able to position the grill mounting apparatus for convenient usage.

While a preferred embodiment of the grill mounting apparatus for a vehicle has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill support apparatus for mounting a grill to a bumper of vehicle which permits the grill to be positioned in a stowed position where the grill is directly behind the vehicle and a deployed position where the grill can be positioned between the stowed position and a position approximate a side the vehicle, the grill support apparatus comprising:
   a pivot assembly comprising:
   a pivot collar; and
   a first clamp means for securing said pivot collar to a bumper of a vehicle in a vertical orientation;
   a support arm having first and second ends, and a horizontal portion intermediate to and extending between said first and second ends, said first end extending vertically downward from said horizontal portion and said second end extending vertically upward from said horizontal portion, said horizontal portion including an offset bend made at a location that is intermediate said first and second ends and being made such that the entire horizontal portion remains in the same plane and such that said first and second ends are offset from each other;
   said first end of said support arm is inserted into said pivot collar and rotatable therewith such that said pivot collar supports said support arm in a cantilever fashion and said support arm is permitted to rotate about said first end;
   a grill support platform having a top surface and a bottom surface, said top surface including at least two grill mounting flanges, said bottom surface including a centrally located and downwardly extending attachment collar;
   said second end of said support arm is inserted into said attachment collar and rotatable therewith such that said grill support platform is rotatable about said second end; and
   a retainer assembly comprising:
   a retainer means to removably receive said horizontal portion of said support arm and retain said horizontal portion of said support arm such that said support arm can not be rotated about said first end thereof; and
   a second clamp means for attaching said retainer means to the vehicle bumper at a spaced distance along the bumper from said first clamp means.

2. The grill support apparatus of claim 1, wherein said first end of said support arm includes a bearing surface in bearing contact with an upper edge of said pivot collar.

3. The grill support apparatus of claim 1, further comprising:
   a thumb screw threadably received by a hole formed through said pivot collar that when tightened prevents said first end of said support arm from rotating in said pivot collar.

4. The grill support apparatus of claim 1, further comprising:
   a thumb screw threadably received by a hole formed through said attachment collar that when tightened prevents said attachment collar from rotating about said second end of said support arm.

5. The grill support apparatus of claim 1, wherein said grill support platform is at least 1.5 times the length as a grill to be attached to said at least two mounting flanges and wherein said mounting flanges are positioned such that grill is attached to said top surface of said grill support platform towards one side thereof, thereby leaving a portion of said top surface uncovered for use as a working surface.

6. The grill support apparatus of claim 1, wherein said receiver member is generally U-shaped and includes a pair of legs having longitudinally aligned holes formed therethrough, and said support arm having a through hole formed therethrough that is in cooperative alignment with said longitudinally aligned holes when said support arm is received between said pair of legs.

7. A grill support apparatus for mounting a grill to a bumper of vehicle which permits the grill to be positioned in a stowed position where the grill is directly behind the vehicle and a deployed position where the grill can be positioned between the stowed position and a position approximate a side the vehicle, the grill support apparatus comprising:
   a pivot assembly comprising:
   a pivot collar; and
   a first clamp means for securing said pivot collar to a bumper of a vehicle in a vertical orientation;
   a support arm having first and second ends, and a horizontal portion intermediate to and extending between said first and second ends, said first end extending vertically downward from said horizontal portion and said second end extending vertically upward from said horizontal portion, said horizontal portion including an offset bend made at a location that is intermediate said first and second ends and being made such that the entire horizontal portion remains in the same plane and such that said first and second ends are offset from each other;

said first end of said support arm is inserted into said pivot collar and rotatable therewith such that said pivot collar supports said support arm in a cantilever fashion and said support arm is permitted to rotate about said first end;

a grill support platform having a top surface and a bottom surface, said top surface including at least two grill mounting flanges, said bottom surface including a centrally located and downwardly extending attachment collar;

said second end of said support arm is inserted into said attachment collar and rotatable therewith such that said grill support platform is rotatable about said second end; and a retainer assembly comprising:

a retainer means to removably receive said horizontal portion of said support arm and retain said horizontal portion of said support arm such that said support arm can not be rotated about said first end thereof and a second clamp means for attaching said retainer means to the vehicle bumper at a spaced distance along the bumper from said first clamp means;

said first end of said support arm includes a bearing surface in bearing contact with an upper edge of said pivot collar;

a first thumb screw threadably received by a hole formed through said pivot collar that when tightened prevents said first end of said support arm from rotating in said pivot collar; and a thumb screw threadably received by a hole formed through said attachment collar that when tightened prevents said attachment collar from rotating about said second end of said support arm.

8. The grill support apparatus of claim 6, wherein said grill support platform is at least 1.5 times the length as a grill to be attached to said at least two mounting flanges and wherein said mounting flanges are positioned such that grill is attached to said top surface of said grill support platform towards one side thereof thereby leaving a portion of said top surface uncovered for use as a working surface.

9. The grill support apparatus of claim 7, wherein said receiver member is generally U-shaped and includes a pair of legs having longitudinally aligned holes formed therethrough, and said support arm having a through hole formed therethrough that is in cooperative alignment with said longitudinally aligned holes when said support arm is received between said pair of legs.

* * * * *